(No Model.)
F. G. KAMMERER.
BOTTLE OR VESSEL HOLDING DEVICE.
No. 527,334. Patented Oct. 9, 1894.
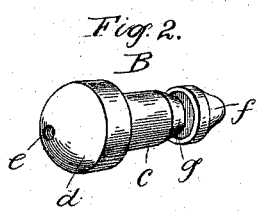
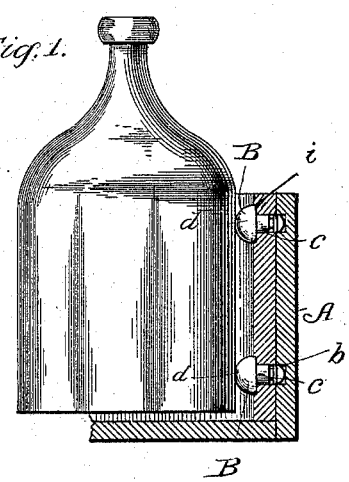
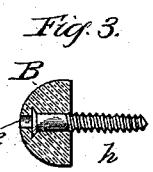
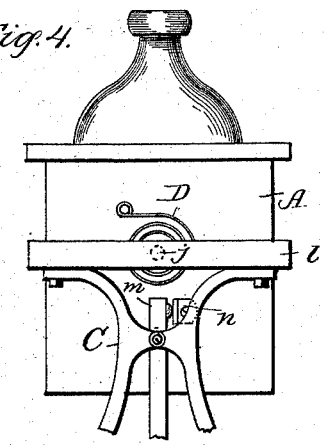
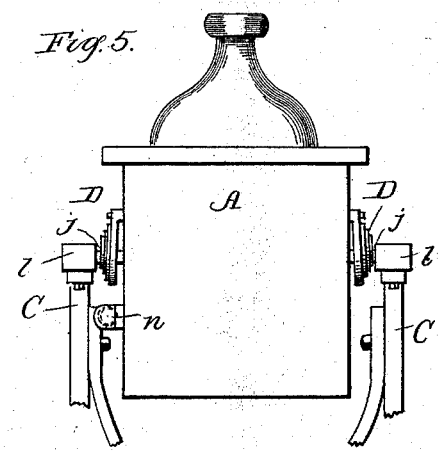
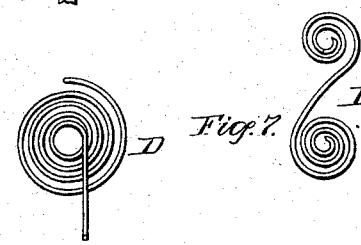
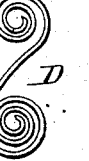
Witnesses.
Victor J. Evans.
J F Beale
Inventor:
Frank G. Kammerer
By W A Redmond
Attorney.
THE NORRIS PETERS CO., PHOTO-LITHO., WASHINGTON, D. C.

UNITED STATES PATENT OFFICE.

FRANK G. KAMMERER, OF CHICAGO, ILLINOIS.

BOTTLE OR VESSEL HOLDING DEVICE.

SPECIFICATION forming part of Letters Patent No. 527,334, dated October 9, 1894.

Application filed April 19, 1893. Serial No. 470,989. (No model.)

*To all whom it may concern:*

Be it known that I, FRANK G. KAMMERER, a citizen of the United States, residing at Chicago, in the county of Cook and State of Illinois, have invented certain new and useful Improvements in Bottle or Vessel Holding Devices; and I do hereby declare the following to be a full, clear, and exact description of the invention, such as will enable others skilled in the art to which it appertains to make and use the same.

This invention relates, generally, to devices for holding and transporting bottles or other vessels, and particularly to devices for this purpose which are adapted to permit the bottle or vessel holder, proper, to be tilted to draw off or decant the contents of the bottle or vessel held thereby, and it has for its object to provide a simple, durable and comparatively inexpensive bottle holder adapted to frictionally hold or grasp the bottle or vessel to prevent the same slipping out when the holder is tilted and to prevent the shock and jar incident to the handling and transportation of such holders affecting the contents of the bottle or vessel, and it consists in the parts and combinations of parts hereinafter described and claimed.

In the accompanying drawings forming a part of this specification, Figure 1 is a fragmentary section of the bottle or vessel holder, proper, with a bottle in position therein; Fig. 2, a perspective view of one of the cushions for holding the bottle or vessel in the holder; Fig. 3, a longitudinal vertical section through a modified form of cushion; Fig. 4, a side elevation of the holder mounted tiltably in a supporting frame; Fig. 5, a front elevation of the same, and Figs. 6, 7 and 8 detail views of modified forms of springs.

Similar letters refer to similar parts throughout all the views.

A represents the holder, proper, which consists of a case or box, preferably rectangular in shape, in the corners of which, if rectangular, is secured a cleat $a$ having openings or recesses $b$ formed therein to receive the shank or stem $c$ of the cushions B so that the heads of said cushions extend beyond the outer face or surface of the cleats $a$, as shown in Fig. 1. The cushions are formed, preferably, of rubber, half-spherical, and with a cavity or recess $e$ in the center thereof as shown best in Fig. 3, so that it will readily yield to pressure and at the same time frictionally grasp the bottle or vessel firmly to hold it in the case or box, thus breaking the force of the frequent jars and shocks to which such articles are subject during transportation and also preventing the bottle or vessel slipping or falling out of the box or case when the latter is tilted to decant the contents of the bottle as will be described.

In Fig. 2, I show a rubber cushion having a half spherical head $d$, a reduced stem or shank $c$ and a conical or cap shaped end $f$ joined to the shank or stem $c$ by a reduced connecting neck $g$, so that when said shank or stem is inserted in the opening or recess $b$ of the cleat $a$ and firmly pressed therein the edge or rim of the cap $f$ will be contracted in said opening and render its accidental withdrawal from the opening or recess extremely difficult, as the rim of the cap will adhere to the wall of the opening and spread or turn back on itself when it is attempted to remove the cushion by drawing it out.

In Fig. 3 I show a modified form of cushion B which is simply a half sphere of rubber having a central opening $e$ extending therethrough so that an ordinary wood screw $h$ may be inserted therein and driven into the cleat $a$ at the desired points the head of said screw being sunk in the rubber cushion, as shown. A countersunk recess $i$ may be formed in the cleats surrounding the openings $b$ so that the cushions may rest partly therein and thus prevent lateral movement of said cushions when a bottle or vessel is forcibly inserted in the box or case or withdrawn therefrom.

In Fig. 1 of the drawings I show the upper cushion as seated in the recess $i$ but it will be understood that each of the cushions may be so seated, if desired, although the use of the recesses is not absolutely necessary to the practical use of the device. The box or case is provided at each side with a trunnion $j$ at a point slightly above the center of height of the box or case whereby said box may be pivotally suspended or mounted in the longitudinal beams $l$ of a frame C so as to be free to be swung or turned on its bearings between said beams. Attached at one end to each side of the box or case is a coiled or helical spring D, surrounding the trunnions, the point of attachment being to one side of the trunnions $j$, the other end of said spring being attached to the frame C at a point diametrical by opposite the point of attachment to the box or case, the object of the springs being to return the box or case to its normal or set position after the same has been swung or turned from said position.

In Figs. 4 and 5 the springs shown are simple coiled or helical springs with one end attached to the box or case at one side of and above the trunnion while the other end is attached near the point where the trunnions find their bearings in the beam $l$; and this form of spring answers very well where the box or case and the bottle or vessel is not very heavy, but where the box or case is heavy I find that the forms of springs shown in Figs. 6, 7 and 8 are preferable owing to the greater power springs of this form will exert.

The spring shown in Fig. 6 is an ordinary coiled or helical spring the inner end of which is extended at right angles to and across the coils of the springs and is to be attached to the frame or box or case, as desired, at a point some distance beyond the outermost coil of the spring and at a point practically diametrically opposite the point of attachment of the other end of the spring.

In Fig. 7 I show a spring formed like a reversed letter S, each end thereof being coiled on itself, while in Fig. 8 I show another form of the spring in which one end is coiled but once and the other end formed of numerous coils.

In each of the springs shown in Figs. 6, 7 and 8, it will be noticed that the points for attachment are removed from the center of the springs and are at points widely separated from each other, thereby adding greatly to the strength of the spring, and rendering the return of the box or case to its normal position certain notwithstanding the weight of the case or the bottle or vessel and contents thereof.

It is evident that the box or case may be arranged in a directly vertical position in the frame or it may be arranged in an inclined position therein as desired by simply changing the points of attachment of the springs to the box or case and the frame.

From the above description it will be understood that the springs will be wound up when the box or case is depressed and upon releasing the same the springs, in unwinding, will exert their strength to return the box or case to its normal position and will prevent the box or case swinging over beyond its normal position or vibrating on its bearings from side to side, as the springs are stiff enough in either winding or unwinding to resist the tendency of the box or case to vibrate to any extent. In order, however, to arrest the case in any desired set position on its return I provide the stop $m$, which is preferably a cushioned, or half-spherical rubber stop secured to the frame in the desired position, against which an angle plate $n$ secured to the box or case engages to arrest the return movement of the box or case.

I have described the cushions B as being half-spherical in form or shape as this is the preferred form, but I do not desire to be limited to cushions of such shape, as they may be of other forms or shape adapted to yield to the bottle or vessel and grasp or adhere closely thereto without material departure from the spirit or scope of my invention.

Having thus described my invention, what I claim as new, and desire to secure by Letters Patent, is—

1. In a bottle holding device, the combination of a box or case having cushions formed with recessed faces secured therein at suitable points to form frictional bearings for bottles or vessels, substantially as described.

2. In a bottle holding device, the combination of a box or case having cleats secured therein, and cushions having recessed faces secured to said cleats and adapted to frictionally hold a bottle or vessel in said box or case, substantially as described.

3. In a bottle holding device, the combination of a box or case for holding bottles or vessels, half-spherical elastic cushions formed with recessed faces secured in said box or case, and means for pivotally supporting said box or case, whereby the bottles or vessels will be frictionally held against movement when the box or case is tilted substantially as described.

4. The combination, in a bottle holding device, of a suitable frame, a box or case pivotally mounted therein, and coiled or helical springs attached to said box or case at one end and to said frame at the other end at diametrically opposite points and away from the centers of said springs, substantially as described.

5. The combination in a box or case for holding bottles or vessels provided with recessed cleats, of half-spherical cushions, and means for securing said cushions immovably in the recesses of said cleats, substantially as described.

6. The combination, in a bottle holding device, of a suitable frame, a box or case adapted to hold bottles or vessels pivotally mounted in said frame, a stop secured to said box or case, and a cushioned stop secured to said frame in position to engage the first named stop, whereby said box or case may be arrested at its normal position, substantially as described.

7. The combination, in a box or case for holding bottles or vessels provided with recessed cleats, of semi-spherical elastic cushions formed with a recessed bearing face, and means for securing said cushions to said cleats, substantially as described.

In testimony whereof I affix my signature in presence of two witnesses.

FRANK G. KAMMERER.

Witnesses:
 SAMUEL MINCER,
 W. L. KAMMERER.